Jan. 6, 1959  G. HIRS  2,867,326
FILTER APPARATUS
Filed Sept. 27, 1955  8 Sheets-Sheet 2

INVENTOR.
GENE HIRS.
BY
Wallace P. Lamb
ATTORNEY.

Jan. 6, 1959     G. HIRS     2,867,326
FILTER APPARATUS

Filed Sept. 27, 1955     8 Sheets-Sheet 3

INVENTOR.
*GENE HIRS.*
BY
*Wallace P. Lamb*
ATTORNEY.

Jan. 6, 1959             G. HIRS             2,867,326

FILTER APPARATUS

Filed Sept. 27, 1955             8 Sheets-Sheet 7

Fig. 18

INVENTOR.
GENE HIRS.
BY
Wallace P. Lamb
ATTORNEY.

United States Patent Office 2,867,326
Patented Jan. 6, 1959

2,867,326
FILTER APPARATUS

Gene Hirs, Detroit, Mich.

Application September 27, 1955, Serial No. 536,903

14 Claims. (Cl. 210—104)

This invention relates generally to fluid purifying apparatus and particularly to liquid filtering apparatus.

This invention is a continuation-in-part of my copending application filed February 21, 1955, Serial No. 489,383 for Filter Apparatus, now abandoned.

It is an object of my invention to provide an improved fluid filtering apparatus in which a decrease in filtering rate due to accumulation of foreign matter on a filter medium initiates a controlled cycle of automatic operations to dispose of the foreign material and replace the filter medium.

Another object of the invention is to provide an apparatus of the above mentioned character having the advantages of forced filtering to increase filter rate together with positive control of automatic replacement of the filter medium in response to a condition of the fluid.

Another object of the invention is to provide a liquid filter apparatus wherein a portion of a filter material is held between two separable fluid conductors which are automatically separated to permit movement of a clean portion of the filter material into place without loss of the liquid when the conductors are separated.

Another object of the invention is to provide for forced drainage of liquid from separable liquid conductors to avoid spillage on separation of the conductors and to decrease filter medium replacement time.

Another object of the invention is to provide an improved automatically operated filter media feed machine for supporting and replacing the filter medium in the filtering apparatus.

Another object of the invention is to feed filter media on a pervious conveyor belt to the filtering machine to reinforce said media against rupture and to avoid sticking of the media to its backing in the filtering flow passage.

In connection with the next preceding object, it is a further object to extricate the used filter medium from the interstices of the pervious belt, into which the filter action presses the medium, so that the used medium will be discharged from the end of the conveyor instead of clinging to the belt and winding about the conveyor parts.

Another object of the invention is to provide an improved liquid filtering apparatus in which a suction pump is used to perform the dual function of effecting forced filtering of the liquid through an automatically replaceable filter medium during filter operation and of effecting forced drainage of the liquid prior to filter medium replacement to decrease the replacement interval.

Another object of my invention resides in the provision of a movable, pervious backing member carrying and feeding filter media into position over a relatively stationary member in a filter machine to support the filter media against rupture.

Other objects of the invention will become apparent from the following description taken in connection with the drawings in which.

Figure 1:
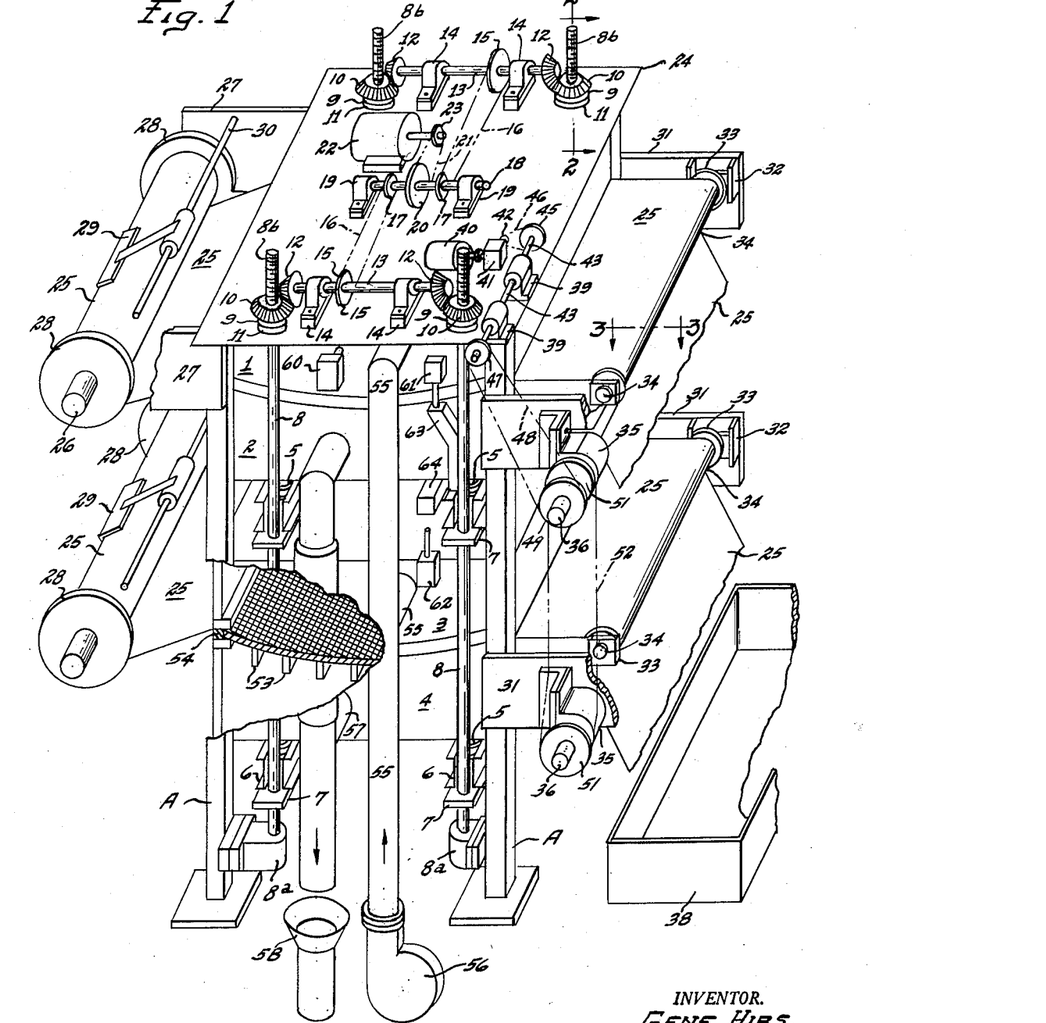
Fig. 1 is an isometric view of my fluid filtering apparatus and filter medium replacement machine.
Figure 2:
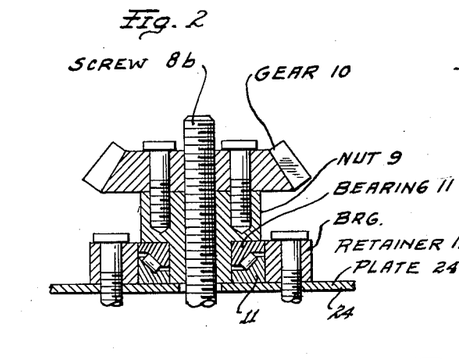
Fig. 2 is a vertical sectional view of a detail of the apparatus, taken along line 2—2 of Fig. 1.

In Figure 1 is shown a frame structure consisting essentially of vertical legs A. The apparatus here disclosed comprises two filtering units operating in unison, although more units may be built into the machine if desired. Each of such units comprises a pair of separable, fluid conductors, or shells one above the other, and the upper shells are designated by the numerals 1 and 3, which are welded to the legs A. The lower shells 2 and 4 are movable vertically by reason of their mounting on coil springs 5 which rest on supporting channels 6, movable vertically by mechanisms to be described. The channels 6 rest on collars 7 mounted on vertically movable tension rods 8 having their lower ends received in bearings 8a fastened to the legs A. The collars 7 prevent the rod 8 from turning beyond the small arc that brings a corner of a collar into engagement with the adjacent leg A.

The rods 8 are outside the shells 1, 2, 3, 4 and pass through a cover plate 24 on the upper end of the legs A. Above the legs the rods are threaded at 8b and engage nuts 9 attached to bevel gears 10. The nuts rest on thrust bearings 11 which is held in place by retainer 11a. A horizontal shaft 13 is mounted in bearings 14 on the plate 24 and carries bevel pinions 12 meshing with the gears 10. The threads of 8b are of opposite hand on the two ends of shaft 13. This provides similar movement to all four screws and nuts. Two such pairs of rods 8 and corresponding drive assemblies are provided for balanced support as shown in Figure 1. Each such shaft 13 carries a sprocket 15 connected by a chain 16 to another sprocket 17 on a central parallel shaft 18 mounted in bearings 19 on the plate 24. A motor 22 on the plate 24 drives a sprocket 20 on the shaft 18 through a chain 21 connected to a motor sprocket 23.

A filter fabric 25 passes between each upper shell 1, 3 and corresponding lower shell 2, 4. Since the construction is the same for each pair of shells, only one assembly need be described. Each fabric 25 is wound on a shaft 26 supported at one side of the frame structure by suitable brackets 27. Collars 28 on the ends of the shaft prevent shifting of the fabric roll. A weighted arm 29 pivoted on a stationary shaft 30 rests on the roll of fabric to prevent unrolling at random. The weight also adds some tension to the fabric before entering between the shells.

Figure 3:
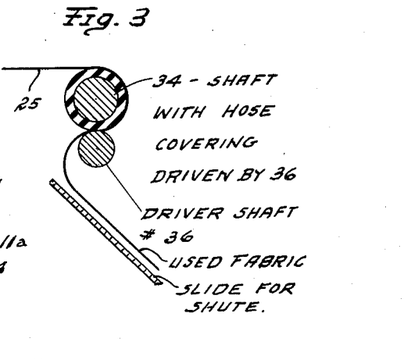
Fig. 3 is a vertical sectional view of a detail of the filter medium replacement machine, taken along line 3—3 of Fig. 1.
Figure 4:
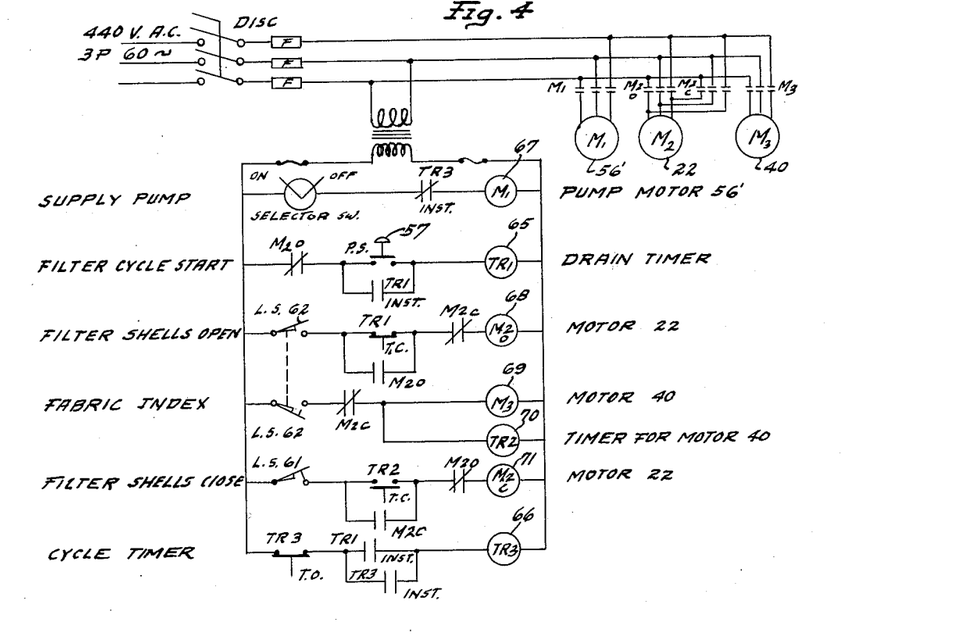
Fig. 4 is a schematic diagram of the controls and circuits of my apparatus.

At the other side of the machine are mounted pairs of horizontally spaced brackets 31 carrying vertical guides 32. In each guide is slidably mounted a bearing 33 and a pair of opposed bearings support a horizontal shaft 34. These shafts are preferably covered with a synthetic rubber-like material such as "neoprene" to increase the coefficient of friction as will presently appear. The covered shafts 34 are in fact idler rolls. The brackets 31 also carry pairs of alined bearings 35 below the rolls 34. In each pair of bearings 35 is mounted a shaft 36 bearing against the filter fabric 25 wound on the corresponding roll 34 after it has passed between the filter shells. The sheet 25 is carried inward or behind the shaft 36, as shown in Figure 3 and is then guided on an inclined slide 37 to a tote box 38.

Another motor 40 on the plate 24 drives a gear box 41 and a sprocket 42. A shaft 43 mounted in bearings 39 on the plate 24 carries a sprocket 45 joined by a chain 46 to the sprocket 42. The shaft 43 carries another sprocket 47 connected by a chain 48 to a sprocket 49 on the upper power shaft 36. The upper and lower shafts 36 are interconnected by sprockets 51 thereon and a chain 52.

The fabric 25 between the shells is supported on a grating and attached screen 53 mounted on the top of each lower shell 2 and 4. The upper edge of each lower shell also carries a gasket 54 which functions as a seal between the upper and lower shells when they are brought together.

In the operation of the device in this position, liquid to be filtered is fed into the upper shells 1 and 3 through a supply pipe 55 charged by a pump 56 which is driven by a motor 56'. The liquid filters through the inserted fabric 25 and screen 53 to the lower shells 2 and 4 from which it is withdrawn through a telescopic discharge pipe 57 emptying into a stand pipe or funnel 58 spaced below its lower end. This construction of the discharge conduit permits vertical movement of the shells 2 and 4 in the manner to be described.

The stationary upper sections 1 and 3 carry limit switches 61 and 62 respectively. The upper movable shell 2 carries upper and lower switch actuating brackets 63 and 64 for the switches 61 and 62 respectively.

As the solids accumulate on the filter fabric and close off the fabric openings, the resistance to flow increases and the liquid pressure builds up in the top shell of the filter. When the pressure reaches a preset value the contacts of pressure responsive switch 60 are actuated and the cycle for the removal of contaminated fabric and replacement with clean filter fabric begins. Upon the actuation of the pressure responsive switch 60, the drain timer 65 is energized. This allows sufficient time for the liquid in the upper shells to drain out before the filter shells separate. Timer 65 instantly energizes timer 66 which controls the shut-off and starting of the filter pump 56. Timer 66 deenergizes contactor 67 which stops pump motor 56'. When the drain timer 65 has gone through its time delay and allowed the liquid to drain out, the contactor 68 is energized. This starts motor 22 which through sprockets, gears and nut drives rods 8 down and separates the filter shells. As the shells separate, bracket 64 energizes limit switch 62 which de-energizes contactor 68 and stops motor 22. At the same time, limit switch 62 closes the control circuit to energize contactor 69 and timer 70. Contactor 69 starts fabric index motor 40, and timer 70 shuts it off after a pre-set time. Timer 70 at the same time energizes contactor 71 which starts motor 22 to close the filter shells. As the shells close, bracket 63 engages limit switch 61 which de-energizes contactor 71 and stops motor 22. A few seconds after the filter shells are closed, timer 66 is de-energized and starts pump 56 by energizing contactor 67 which allows pump motor 56' to operate. Liquid is then supplied by the pump to the filter and goes through the clean fabric which has just been pulled into place.

Figure 5:
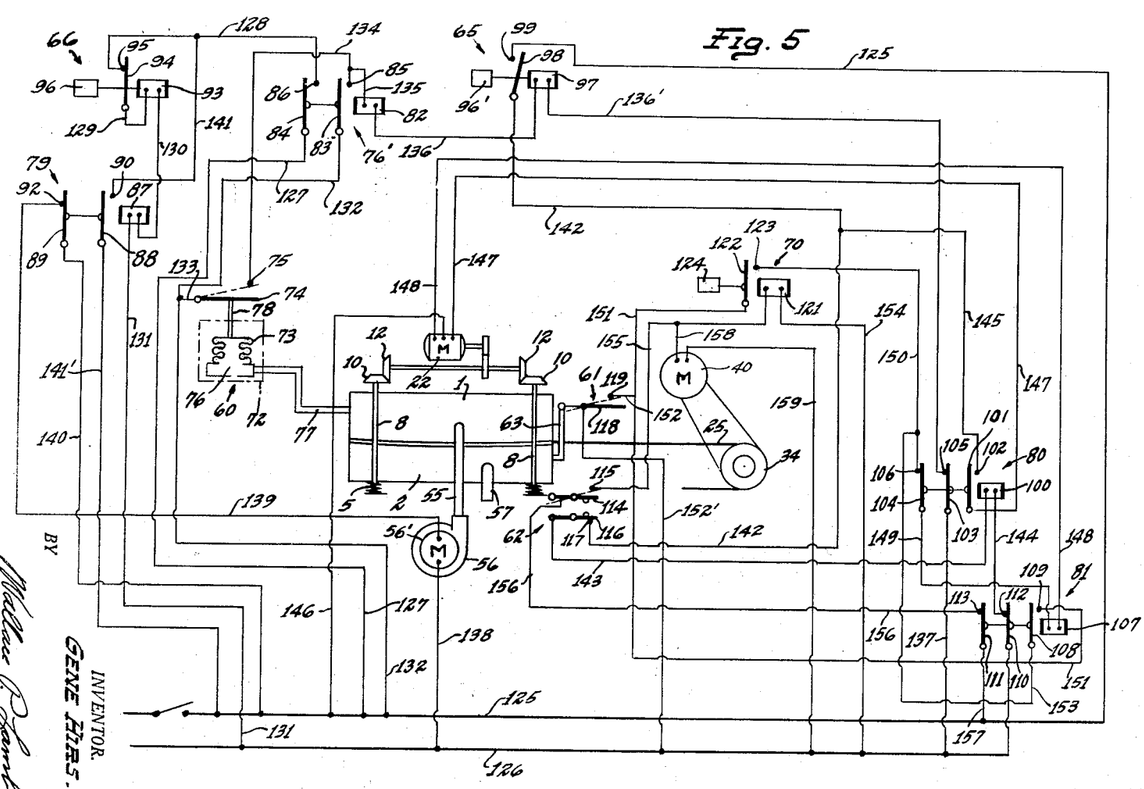
Fig. 5 is a diagrammatic illustration of the apparatus, its controls and electrical circuits to augment the schematic diagram of Fig. 4.

In Fig. 5, I have shown a diagrammatic illustration of my filtering apparatus, its controls and circuitry therefor. In this illustration, the various movable controls are in their normal positions or positions they will assume during filtering operation of the apparatus. The pressure responsive control 60 is represented as comprising, in general, a casing 72, a power element or bellows 73, and a switch including a movable contact or blade 74 and a fixed contact 75. In the usual manner, the bellows forms with casing 72 a pressure chamber 76 which is in communication by a conduit 77 with the interior of upper shell 1. A connecting member 78 connects the closed movable end of the bellows 73 to the movable switch blade 74 whereby expansion and contraction of the bellows will respectively make and break contacts 74, 75. While I have illustrated the pressure responsive control 60 as simply a pivoted switch blade for purposes of simplicity, it is to be understood that said switch may be of the well known snap acting type.

The pressure responsive switch 60 controls the pump 56, and also controls the shell operating motor 22. To this end, there is provided and controlled by pressure switch 60, a controlling relay 76', a pump controlling relay 79, the cycle timer 66 and a pair of motor controlling relays 80 and 81 for the reversible shell operating motor 22.

Control relay 76' includes the usual coil 82, and a pair of connected normally open switches including movable contacts or switch blades 83, 84 and cooperating fixed contacts 85 and 86 respectively. Similarly, the pump controlling relay 79 comprises a coil 87 and a pair of connected, movable switch blades 88, 89 cooperable respectively with a pair of fixed contacts 90, 92. Normally, or during filtering operation, contacts 88 and 90 are open and contacts 89 and 92 are closed, as shown.

The cycle or pump timer 66 is represented as a delayed acting relay comprising a coil 93, a switch blade 94 and a fixed contact 95. The numeral 96 designates a time delay means, such as a dash-pot to effect a time elapse before contacts 94 and 95 are broken. This timer 66 is referred to as the cycle timer as it is set to prevent resumation of the operation of pump 56 until the cycle of operations to replace the filter medium has been completed.

The drain timer 65 is similar to the above described timer 66 and is represented as a delayed acting relay having a dash-pot 96'. The relay includes the usual coil 97, a normally open switch blade 98, and a fixed contact 99. This timer 65 is set to close and actuate motor relay 80 to start motor 22 to open shell 2 after a time elapse during which it is calculated the liquid will have drained from the shell below the level of the shells separating joint.

Motor relay 80 comprises the usual coil 100, a normally open switch blade 101, and a fixed contact 102. Connected to switch blade 101 is a pair of additional and normally closed switch blades 103 and 104 cooperable respectively with a pair of fixed contacts 105 and 106, the function of these additional switches being hereinafter fully described.

Motor relay 81, like relay 80, is represented as comprising a coil 107 and a normally open switch including a movable switch blade 108 and a fixed contact 109. Connected to operate with blade 108 is a pair of normally closed switches including switch blades 110, 111, and respectively cooperating fixed contacts 112, 113.

Limit switch 62 which is actuated by the separation movement of shell 2 approaching its fully open position, is a double switch including a normally open switch blade 114 and a cooperating fixed contact 115. The other switch is normally closed and includes a switch blade 116 and cooperating contact 117. Switch 62 limits opening or downward movement of shell 2 by breaking the circuit of the motor control relay 80.

Limit switch 61 is biased to closed position, but is normally held open by abutment 63 on the movable shell 2. The limit switch 61 includes a switch blade 118 and a cooperating contact 119. This switch limits closing movement of shell 2 by breaking the circuit of the motor control relay 81.

The timer or delayed action relay 70 is provided to time operation of motor 40 so as to feed just sufficient of the clean filter medium 25 between the shells 1 and 2 to replace the used filter medium. Like the previously described timers, the delayed action relay 70 comprises a coil 121, a normally open switch including a switch blade 122, cooperating contact 123, and a time delay means or dash-pot 124.

The numerals 125 and 126 designate the main lines of a source of electric current. From line 125, a lead 127 connects to control relay blade 84 which has its cooperating contact 86 connected by a lead 128 to timer contact 95. A lead 129 connects timer blade 94 to one end of timer coil 93 which has its other end connected by a lead 130 to one end of pump relay coil 87. The other end of coil 87 is connected by a lead 131 to main line 126. A lead 132 from main line 125 connects to the control relay blade 83 and a lead 133 connects the pressure switch blade 74 to lead 132 and therefor to relay blade 83. From relay contact 85, a lead 134 connects to the pressure switch contact 75. Connecting lead 134 and one end of coil 82 is a lead 135 and from the other end of coil 82, a lead 136 connects to one end of the drain timer coil 97. The other end of the drain timer coil 97 is connected by a lead 136' to the motor relay contact 105, the cooperating switch blade 103 being connected by a lead 137 to the main line 126. It will be seen that lead 135 in addition to connecting the pressure switch contact 75 in series with the coil 82, provides a holding circuit with relay blade 83 to by-pass the pressure switch 60 so as to keep the coil 82 closed under certain conditions which permit the pressure switch contacts 74, 75 to part. The said conditions and purpose of the holding circuit is fully described hereinafter in the description of operation of my apparatus.

From main line 126, a lead 138 connects to one terminal of pump motor 56' and from another terminal thereof, a lead 139 connects to contact 92 of the pump motor relay 79. From the switch blade 89 of relay 79, a lead 140 connects to main line 125 thus connecting the pump motor 56' and relay contacts 89, 92 across main lines 125, 126. A lead 141 connects lead 128 and relay contact 90 to provide a holding circuit to keep the cycle timer coil 93 energized when drain timer coil 97 becomes deenergized. A lead 141' connects switch blade 88 to main line 125.

The drain timer 65 has its contact 99 connected to the main line 125 and its switch blade 98 connected by a lead 142 to contact 117 of the limit switch 62. A lead 143 connects the limit switch blade 116 to one end of the coil 100 of the motor relay 80, the other end of coil 100 being connected by a lead 144 to contact 112 which connects through switch blade 110 to main lead 126. Thus, it will be seen that following the draining operation when timer contacts 98, 99 are closed, motor relay coil 100 will be energized closing contacts 101, 102 and opening contacts 103, 105 and 104, 106. A lead 145 connects motor relay contact 102 to lead 142.

The three lead system for the shell operating motor 22 includes a common lead 146 which connects one terminal of the motor to the main line 125. To another terminal of motor 22 a lead 147 connects to the switch blade 101 of motor relay 80 and the cooperating contact 102 is connected by the lead 145 to lead 142.

The motor control relay 81 which controls motor 22 in closing shell 2 has one end of its relay coil 107 connected by a lead 148 to the third terminal of motor 22, the other end of coil 107 being connected by a lead 149 to closed relay blade 104. The cooperating contact 106 is connected by a lead 150 to the filter medium feed or indexing timer contact 123 and the cooperating switch blade 122 is connected by a lead 151 to contact 109 of motor relay 81. To the lead 151 is connected the open contact 119 of limit switch 61 by a lead 152 and limit switch 118 is connected by lead 152' to main lead 126. From the switch blade 108 of motor relay 81, a lead 153 connects to lead 150.

The coil 121 of the timer 70 has one end connected by a lead 154 to main line 126 and has the other end of the coil connected by a lead 155 to contact 115 of limit switch 62. A lead 156 connects limit switch blade 114 to motor relay contact 113, the blade 111 being connected by a lead 157 to main line 125. A lead 158 connects one terminal of motor 40 to lead 155, and a lead 159 connects the other terminal of motor 40 to main lead 126.

*General operation*

During filtering operation, the pump 56 operates to deliver the liquid to be filtered to the interior of upper shell 1 for passage under pressure through the filter medium between the shells, the filtered liquid discharging from outlet 57. As the filtering operation continues, foreign material filtered from the liquid accumulates on the upper surface of the filter medium within shell 1 with accompanying decrease in filtering rate and corresponding increase in pressure within shell 1. The pressure responsive control 60 is set to respond to a pressure in the upper shell 1 calculated to indicate a need of change of filter medium and disposal of the accumulated foreign matter. When this pressure is reached, pressure control switch 74 stops pump 56. After the liquid in upper shell 1 has drained to a level below the separation joint of the shells timed by timer 65, the motor 22 is energized to operate in a direction to lower shell 2. The lowering of shell 2 actuates limit switch 62 to initiate operation of motor 40 which through driving roll 34 feeds the filter medium along its path of travel, moving the used filter medium and accumulated foreign matter thereon to the disposal point and replacing the used filter medium. Operation of motor 40 is limited by the timer 70 which is set such that the filter medium is moved sufficiently to position a clean portion of the strip between shells 1 and 2. Stopping of the motor 40 initiates operation of motor 22 in the opposite direction whereby to close the shell 2 upon which operation of the liquid supply pump 56 is resumed when the cycle timer 66 acts to de-energize pump control relay coil 87.

*Detail description of operation*

When the pressure in upper shell 1, reaches a predetermined pressure due to accumulation of foreign matter on the filter medium, the control 60, responsive to said pressure closes its contacts 74, 75. As a result, the following circuit is completed to energize control relay coil 82 and coil 97 of the drain timer 65. From main line 125 through lead 132, lead 133, contacts 74, 75, leads 134, 135, relay coil 82, lead 136, timer coil 97, lead 136', motor relay contacts 105, 103 and lead 137 to the other main line 126. When the above traced circuit is closed, timer 65 begins timing the drain operation and at the same time control relay contacts 83 and 85, and 84 and 86 are closed. Closing of contacts 84, 86 closes the following circuit to energize the pump control relay coil 87 and the cycle timer coil 93: From main line 125 through lead 127, closed relay contacts 84, 86, lead 128, closed timer contacts 94, 95, lead 129, timer coil 93, lead 130, pump relay coil 87 and lead 131 to the other main lead 126. When this circuit is closed, the cycle timer 66 begins its timing operation and pump relay contacts 89, 92 are instantly broken and contacts 88, 90 are instantly made. The breaking of contacts 89, 92 opens the circuit of and stops the pump motor 56' preparatory to replacing the filter medium. Engagement of contacts 88, 90 establishes the aforementioned holding circuit to hold coils 93, 87 energized after coils 82 and 97 become de-energized. When the pump is stopped, to permit draining of the shells, the pressure therein decreases permitting the pressure switch contacts 74, 75 to break. However, the holding circuit including lead 135, switch blade 83 and lead 132 keep the drain timer coil 97 energized. After an elapsed interval calculated to allow for drainage of liquid from the upper shell 1, the drain timer 65 closes its contacts 98, 99 and completes the following circuit to eenrgize the motor relay 80 to effect opening of shell 2: From main line 125, through timer contacts 99, 98, lead 142, limit switch contacts 117, 116, lead 143, motor relay coil 100, lead 144, and through the normally closed motor relay contacts 112, 110 to the other main line 126. Completion of the above circuit, closes motor relay contacts 101, 102 to complete the following circuit to the shell operating motor 22: From main lead 126, through the normally closed contacts 110, 112, lead 144, motor relay coil 100, lead 143, limit switch contacts 116, 117, leads 142 and 145, motor relay contacts 101, 102, lead 147, motor 22 and through lead 146 to the other main line 125. Also when motor relay coil 100 is energized, contacts 103, 105 are broken, de-energizing the drain timer coil 97, and contacts 104, 106 are broken. Referring to the closing by motor relay contacts 101, 102 of the circuit of a reversible motor 22, when this occurs, the motor operates in a direction to move shell 2 down, away from shell 1 preparatory to replacing the used filter medium. As shell 2 moves down, the abutment 63 carried thereby releases limit switch contact 118 which then moves into engagement with its cooperating contact 119. As the downwardly moving shell 2 approaches its fully open position, it engages and pivots the limit switch blades 114, 116. This effects engagement of limit switch contacts 114, 115 and disengagement of limit switch contacts 116, 117. The engagement of contacts 118, 119 have no immediate effect, but the breaking of contacts 116, 117 de-energizes motor relay coil 100 thereby stopping motor 22 and downward movement of shell 2, and engagement of limit switch contacts 114 and 115 effect energization of filter medium feed motor 40 and its timer 120. Thus, when the shell 2 reaches its selected, fully open position, the limit switch 62 stops motor 22, and energizes motor 40 and its timer 70 to start replacement operation of the filter medium. The circuit of the motor 40 and its timer 70 is as follows: From main line 125 through lead 157, normally closed motor relay contacts 111, 113, lead 156, closed limit switch 114, 115, lead 155, timer coil 121, and through lead 154 to the other main lead 126. Also, the circuit includes motor 40 through lead 158 from lead 155 and through lead 159 to main line 126. The motor 40 now operates to feed a new filter medium to the shells and when a clean portion of the filter strip is positioned between the shells, the motor 40 is stopped by the timer 70 closing its contacts 122, 123. When this occurs, the filter medium feed motor 40 is stopped and at the same time the shell operating motor 22 is started so as to close the shells. The circuit closed is as follows: From main line 126 through lead 152', closed limit contacts 118, 119, lead 151, closed timer contacts 122, 123, lead 150, closed contacts 106, 104, lead 149, motor relay coil 107, lead 148 to motor 22 and from motor 22 through lead 146 to the other main line 125. Closing of the above circuit energizes motor relay 107 which closes contacts 108, 109 to start motor 22 and simultaneously breaks contacts 111, 113 to de-energize motor 40 and timer coil 121. Energizing of motor relay coil 107 also breaks contacts 110, 112.

When the motor 22 is energized as above mentioned, shell 2 is moved thereby to closed position with shell 1 and during such movement limit switch 62 is released to allow it to resume its normal position in which contacts 114, 115 are open, and contacts 116, 117 closed. As the upwardly moving shell 2 approaches its fully closed position, it engages limit switch 61, breaking contacts 118, 119 which de-energizes the motor relay coil 107 and as a consequence stops motor 22. This is followed by cycle timer 66 breaking its contacts 94, 95 which results in de-energization of the pump control relay coil 87 allowing contacts 89, 92 to engage and start the pump to continue the filtering operation. Thus, it will be understood that each time that the pressure in shell 1 increases to the pressure for which pressure switch 60 is set, a cycle of automatic operations is initiated to open the shells, replace the filter medium, close the shells and return the apparatus to filtering operation.

Referring now to Figs. 6 to 18 inclusive, the apparatus shown comprises, in general, a support or standard 160, a fluid filter machine 161, and a filter medium replacement machine 162. The filtering machine 161 and the filter medium replacement machine 162 are both supported by or are mounted on the standard 160.

Figures 6, 7:
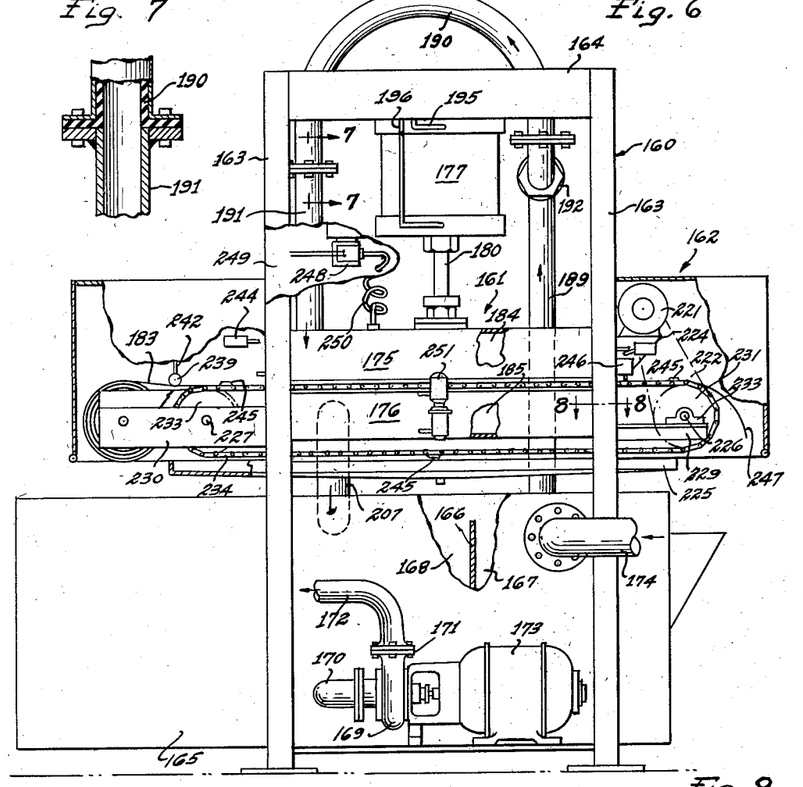
Fig. 6 is a side view of another filter apparatus and automatic filter changer embodying improvements over the apparatus of Figs. 1 to 5.
Fig. 7 is a vertical sectional view, taken along line 7—7 of Fig. 6.
Figure 8:
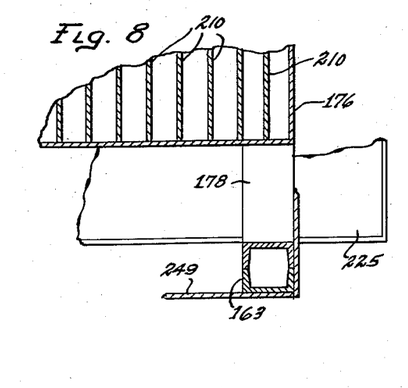
Fig. 8 is a fragmentary horizontal sectional view, taken along line 8—8 of Fig. 6.
Figure 9:
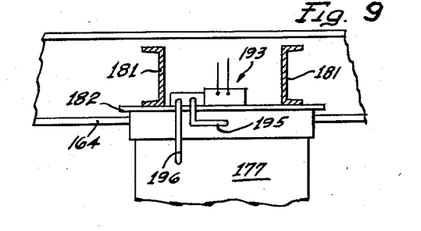
Fig. 9 is a fragmentary vertical sectional view, taken along line 9—9 of Fig. 10.
Figure 10:
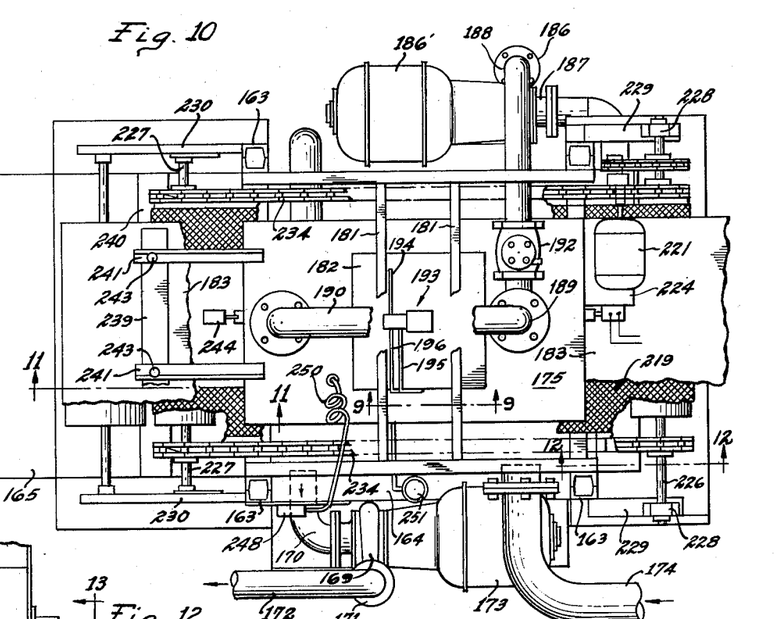
Fig. 10 is a plan view of the apparatus of Fig. 6.

The standard 160 includes four upright load bearing members 163 which are connected together at the upper ends thereof by cross members 164. The uprights 163 and cross members 164 may be welded or be otherwise rigidly secured together.

Where my apparatus is used to filter liquids that are to be reused, such, for example, as coolants and cutting oils, etc. it is desirable for the apparatus to have a storage tank 165 for the liquid. The tank 165 is positioned between the uprights 163, adjacent the lower ends thereof, and is supported by or mounted on the uprights. The tank 165 and uprights 163 may be welded or be otherwise secured together whereby the tank 165 has the additional function of a cross frame structure rigidly connecting the uprights 163 together adjacent the lower ends thereof. Within the tank 165 is a partition 166 dividing the tank into a chamber 167 for liquid to be filtered, and a chamber 168 for liquid that has been filtered. On one side of the tank 165 is a circulating pump 169 which has an intake 170 from the tank chamber 168 and a discharge 171 connected to a supply pipe 172 for delivering the filtered liquid to machines or other points of use, as the case may be. The pump 169 may be driven by an electric motor 173 or by any other suitable power means. A return pipe 174 conducts the liquid from the points of use to tank chamber 167 for filtering by the apparatus.

The filtering machine includes the support or standard 160, a pair of separable fluid conductors or shells 175, 176, and a power element or air cylinder 177. The shells 175, 176 and the air cylinder 177 are supported by the standard 160, the shells 175 and 176 being located just above the tank 165, and the air cylinder 177 being located above the shells. In the present arrangement, shell 175 is arranged directly above shell 176 and is vertically movable whereas the lower shell 176 is stationary. Rigid connecting members 178 (see Fig. 8) secure the lower shell 176 to the four uprights 163. The connecting members 178, lower shell 176 and the uprights 163 may be welded or be otherwise rigidly secured together, the shell 176 thus having the additional function of rigidly connecting the uprights together or serving as a structural part of the standard 160. The upper shell 175 is operatively connected to the piston (not shown) of the cylinder 177 by a connecting rod 180. As is shown more clearly in Fig. 9, a pair of spaced, horizontal supporting members 181 are secured at their opposite ends, such as by welding, to the top cross members 164 to provide a mounting structure for the air cylinder 177. Preferably, the air cylinder 177 has a supporting plate 182 on its upper end and the plate is rigidly secured to the undersides of the supporting members 181 such that the cylinder depends therefrom centrally of and above shells 175, 176.

A fine filter medium 183 which may be thin sheet material, such as paper, is interposed between the separable shells 175, 176 to filter out foreign material in the liquid. The filter paper 183 cooperates with the upper shell 175 to provide an inlet chamber 184, and with the lower shell 176 to provide an outlet chamber 185.

A pump 186 is used to pump liquid to be filtered from tank chamber 167 to the filter inlet chamber 184 within upper shell 175. Preferably, an electric motor 186' is used to drive the pump 186. The pump 186 has an intake 187 in communication with chamber 167 and has an outlet 188 connected to piping including a vertical pipe 189. A pliable fluid conductor or hose 190 connects pipe 189 to an inlet pipe 191 that discharges into the movable shell 175. A hose of rubber, rubberized material or any suitable pliable material which will withstand repeated flexing without rupture may be used.

The capacity of the pump 186 is selected such that liquid is delivered thereby to filter chamber 184 and forced through the filter paper under pressure in chamber 184 whereby to effect an increase in filtering rate over apparatus that depends solely on gravity feed through a filter medium. By this arrangement of forcing liquid through the filter paper with accompanying increase in filtering rate, my apparatus may be compact and occupy small floor space compared to gravity feed apparatus of like filtering rate. In view of the back pressure in the filter inlet chamber 184, a check valve 192 is provided in the piping between the pump outlet 188 and chamber 184.

The air cylinder 177 has the dual function of (1) holding the upper shell 175 down tightly against the lower shell to effect a leak proof joint therebetween during filtering operation and (2), to raise the shell 175 to permit replacement of the used filter paper 183. Any suitable air cylinder may be used, the cylinder shown being of the type in which compressed air is delivered to the top of the cylinder to force the piston therein down to move and hold the shell 175 down in closed position, and is delivered to the bottom of the cylinder to raise the piston and therefore shell 175. To control operation of the air cylinder 177, a solenoid 193 may be used and may be conveniently mounted on the mounting plate 182 of the cylinder as shown, for example, in Figs. 9 and 10. A conduit 194 is represented as leading from a source of compressed air to the solenoid 193 which is connected to the top and bottom of air cylinder 136 by conduits 195 and 196 respectively.

Figure 15:
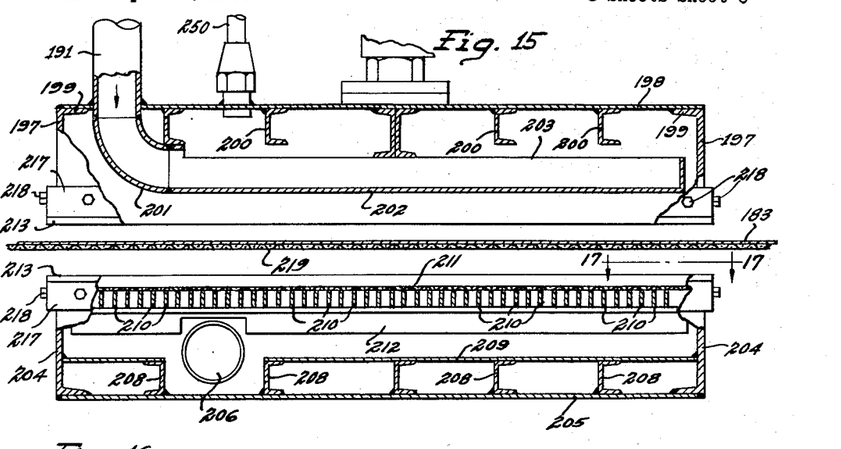
Fig. 15 is a vertical cross sectional view of my filter chamber construction shown open to permit change of filter medium.
Figure 16:
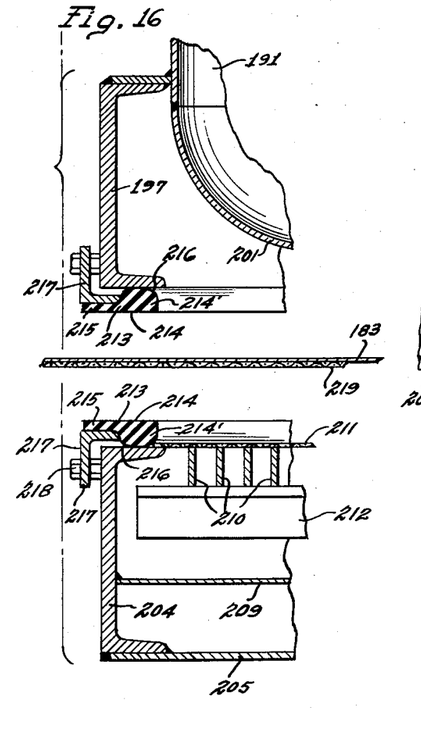
Fig. 16 is a fragmentary enlarged view of Fig. 15 to show certain details of construction.
Figure 17:
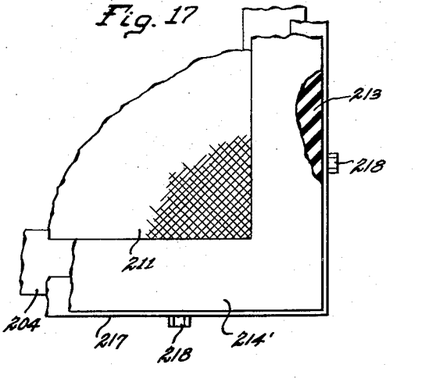
Fig. 17 is a fragmentary plan view, broken away and in section, taken along line 17—17 of Fig. 15.

Referring now to the construction of the shells 175, 176, shown in Figs. 15 to 17 inclusive, the upper shell 175 comprises rigid side channel members 197 and a sheet metal top plate 198. The channel members 197 form a rectangular frame welded at the corners and to the top plate 198 which seats on inturned flanges 199 of the channel members. Inner reinforcing channel members 200 may be provided to reinforce the top plate 198 and may be welded thereto and to the side channel members 197, as indicated. Adjacent one of the channel side members 197 is the aforementioned inlet pipe 191 which extends through the top plate of shell 175 and may be welded thereto as shown. To the inner end of pipe 191 is welded one end of an elbow pipe section 201 to the other end of which is welded one end of a horizontal pipe 202. As shown, the pipe 202 is cut away substantially throughout its length providing an upwardly directed unrestricted discharge outlet 203 into shell 175. The lower shell 176 may be constructed similarly to the upper shell having channel side members 204 welded together at the corners and to a sheet metal bottom plate 205. In one of the side members 204, an outlet 206 is provided for the filtered liquid to discharge through a drain pipe 207 into tank chamber 168. The bottom plate 205 is reinforced with inner channel members 208 welded at their opposite ends to opposite side members 204 and to the bottom plate 205. Resistance to flow by member 208 is prevented by welding a plate 209 to the upper flanges of the reinforcing channels and to opposite side members 204.

Around the upper or open end of the lower shell 176, I provide for supporting the large surface of the filter paper 183 to insure against rupture thereof by the relatively high pressure developed on the inlet side of the filter paper. To accomplish this, I provide the upper end of lower shell 176 with a grating comprising closely positioned grate members 210 and with screening 211 overlying the grating. The grate forming members 210 are arranged in spaced parallel relation with upper edges thereof substantially flush with the shell flanges and the screening 211 spans the grate members 210 and a border of the screening 211 overlaps and may be suitably secured to the shell flanges. Thus, the grating gives support to the screening 211 over the entire area thereof and together give support to the filter paper over the entire area thereof between the outer peripheries of the shells. The grate members 210 may be secured to shell 176 in any suitable manner such as by welding them to angle members 212 which in turn may be welded to opposite sides of the shell.

In order to insure against fluid leakage from the pressurized chamber 184, I provide each shell around the opposed edges thereof with a displaceable seal or gasket 213 to form a sealed joint between the shells. The seals 213, which may be rubber or other suitable, displaceable material are arranged on the opposed shell flanges for mutual engagement and displacement when the upper shell 175 is down, or in closed position. As shown in Fig. 16, the mutually engaging surfaces of the gaskets 213 are flat, as at 214, and large to effect good sealing of the joint. Each of the gaskets 213 comprises a body portion 214' and a mounting flange 215. In cross section, the body portion 214' of each seal has a bead or rounded surface 216 adapted to engage the outer surfaces of the corresponding shell flanges. These beaded or rounded surfaces 216 provide the same sealing effect for variable pressure in chamber 184, the variable pressure being due to build-up of foreign matter on the inlet side of the filter medium. Each of the seal flanges 215 is bonded to one leg of angle members 217 which with the seals 213 extend entirely around the opposed edges of the shells and are attached thereto. As shown in Fig. 16, the angle members 217 are spaced from the side flanges of the shells and may be secured to the shells by bolts 218.

The filter medium replacement machine 162 comprises, in general, a filter paper support and feed means of conveyor belt 219, and a conveyor drive means or electric motor 221. The conveyor belt 219 is of the endless type having an upper or lead side extending between the separable shells 175, 176, and a follower side extending below the stationary shell 176. One end of the conveyor, as at 222, is the feed or drive end and the conveyor driving motor 221 is mounted at this end above the conveyor belt on a suitable mounting 224. The mounting 224 may be suitably secured to the standard 160. Beneath the conveyor and above tank 165, is a drip pan 225 which is preferably provided to catch the liquid drip from the conveyor belt 219, the drip pan discharging into the tank chamber 168.

Any suitable type of conveyor mechanism for moving the belt 219 may be used. In the present machine, the conveyor includes horizontal shafts 226 and 227 respectively located at the feed and discharge ends of the conveyor. Shaft 226 is rotatably supported in mountings 228 which are in turn supported on side extension supports 229 which are rigidly secured to the standard 160. Similarly, at the feed end of the conveyor, the shaft 227 is rotatably uspported on parallel supporting extensions 230 which extend from and are secured to the standard 160. On the shafts 226 and 227 are spools 231 and 232 respectively around which the belt 219 travels and is guided. On each of the shafts 226 and 227, outwardly of the spools, are sprockets 233 around which travel spaced, parallel endless chains 234 to which the belt 219 is attached for travel therewith.

Figures 11, 12, 13, 14:
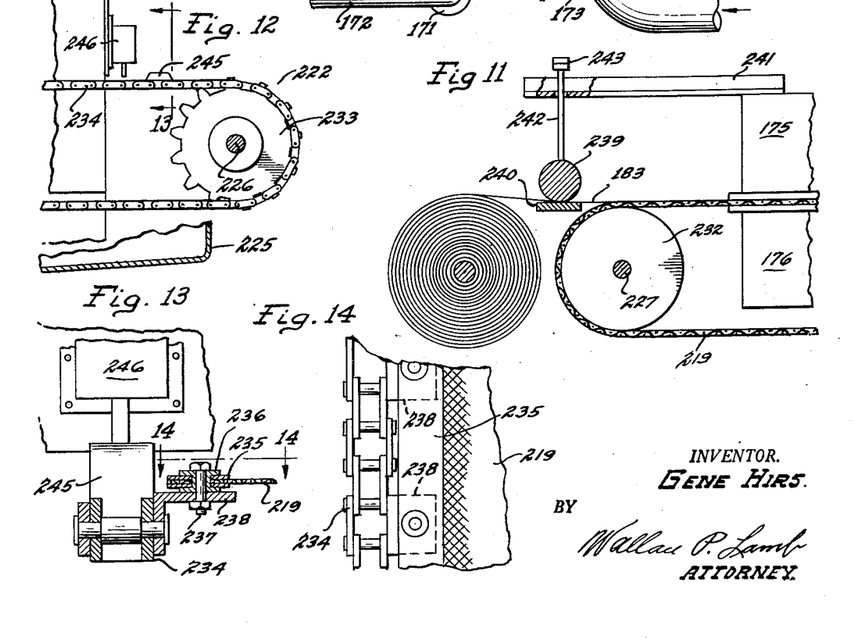
Fig. 11 is a fragmentary vertical sectional view, taken along line 11—11 of Fig. 10.
Fig. 12 is a fragmentary view partly in elevation and partly in section, taken along line 12—12 of Fig. 10.
Fig. 13 is a fragmentary view partly in elevation and partly in section, taken along line 13—13 of Fig. 12.
Fig. 14 is a fragmentary plan view, taken along line 14—14 of Fig. 13.

The belt 219 is, of course, pervious to liquid to allow for passage of the filtered liquid to the lower shell 176 and this belt may be made of any suitable material, woven, knitted or otherwise fabricated to provide a fine, strong netting. Fabric or plastic material may be used for the belt. Opposite edges of the belt 219 are preferably bound and reinforced by double thicknesses of a closely woven fabric, such as canvas strips 235, sewn to borders of the belt proper. At spaced intervals along their lengths, the canvas bindings 235 may be provided with eyelets 236 to receive bolts 237 for attaching the belt 219 to the conveyor chains 234. As shown in Figs. 13 and 14, the chains 234 may have links thereof provided with inturned tabs 238 to which the bolts 237 may attach the belt 219 for travel with the chains.

Mounted on the extension supports 230 at the feed end of the conveyor is a roll of the filter paper arranged outwardly of the conveyor in position such that the paper will feed flat onto the upper or lead side of belt 219. During filtering operation, an intermediate portion of the belt 219 and filter paper thereon are held tightly between the seals 213 of the shells 175, 176, and the pressure in the filter inlet chamber 184 presses the paper into the interstices of the belt 219. As a consequence, the used filter paper clings to the belt and if allowed to continue to do so would wind around and clog the conveyor. To overcome this objection, I provide at the feed end of the conveyor, a restrainer or weight 239, the function of which is to restrain movement of the filter paper for an initial movement of the belt 219 whereby to dislodge the filter paper from the interstices of the belt. Normally, the weight 239 rests on a support or plate 240 with the filter paper extending between the weight and the support. The plate 240 is horizontally disposed between the filter paper roll and the feed end of the conveyor (see Fig. 11), the plate being suitably secured at opposite ends thereof to the conveyor extension supports 230. To lift the weight 239 from the paper after disengagement of the paper from belt 219, I utilize the upward, opening movement of shell 175. Thus, I secure to shell 175, a pair of spaced extensions 241 which extend horizontally above the weight 239 and have clearance holes to receive the upper ends of a pair of rods 242 that are secured at their lower ends to weight 239. The rods 242 extend above the shell extension members 241 and have abutments 243, preferably nuts for engagement by the extensions after predetermined upward movement of shell 175.

Also actuated by upward or opening movement of shell 175 is a limit switch 244, actuation of which initiates operation of the conveyor driving motor 221. Stopping of the conveyor is effected by one of a number of spaced operating members or lugs 245 on one of the conveyor chains engaging and actuating a limit switch 246. Thus, switches 244 and 246 constitute indexing controls which function to control conveyor operation such that the proper length of clean filter paper is advanced each time that replacement is effected. It will be noted that the relative arrangement of the movable shell 175, limit switches 244, 246 and the weight 239 is such that upward movement of the shell 175 first initiates operation of the conveyor followed closely by a lifting of the weight 239 so that the paper moving with the conveyor a sufficient distance to position clean filter paper between the shells. The used filter paper and foreign matter collected thereon roll off the discharge end of the conveyor as at 247, where the paper and foreign matter may discharge into a suitable waste container (not shown).

During filtering operation, foreign material filtered out of the liquid collects on the filter paper and in time causes a noticeable decrease in filtering rate with corresponding increase in back pressure in the inlet chamber 184. The increase in back pressure is, of course, indicative of the need for replacement of the filter medium and disposal of the foreign material. Accordingly, I provide a control or pressure responsive switch 248 (see Fig. 6) which is set to respond to a predetermined increase in pressure in chamber 184 to shut off pump 186 and control separation of the shell 175 from shell 176. The pressure responsive switch 248 may be mounted on the standard 160 or on a sheet metal covering 249 therefor and may be in communication with the interior of chamber 184 by means of a flexible conduit or hose 250.

In order to avoid spillage and loss of liquid which would occur if the shells were separated while the level of the liquid was above the shells' separating joint, I provide a liquid level control device 251 which controls operation of the air cylinder 177 mutually with the pressure responsive switch 248 such that the air cylinder is not actuated until the level of the liquid has decreased to a level below the joint of the shells. The liquid in the shells 175, 176 drains out of the bottom shell by gravity, but I supplement the natural drainage by introducing air pressure into the upper shell 175 to force expulsion of the liquid and thereby decrease the time required to effect drainage of the liquid and therefor replacement of the filter paper. To accomplish this, I provide a conduit 252 which I connect with the source of compressed air through conduit 194 and to the flexible hose 250 and therefor to the interior of separable shell 175. In conduit 252 is a control or solenoid 253 which is controlled by the pressure responsive switch 248 so as to introduce the compressed air at the proper time into chamber 184.

The pressure responsive switch 248 is diagrammatically represented as comprising, in general, a pressure responsive bellows 254 and a movable contact or switch blade 255. These may be provided in a suitable casing 256. In the usual manner, the bellows 254 has an open end thereof sealed and secured to the casing providing a pressure chamber which I connect in communication with conduit 194 and the hose 250. The other and closed end of the bellows 254 is movable and the switch blade 255 is carried thereby. Normally, i. e., during filtering operation, switch blade 255 is in engagement with a contact 257 which holds the circuit of the motor of pump 186 closed. On increase in pressure within shell 175, switch blade 255 and contact 257 are broken and blade 255 then engages a pair of contacts 258, 259. Directly above blade 255 in an electro-magnet 260 of sufficient strength to hold the blade in engagement with contacts 258, 259 when the pressure decreases in the shell chamber 184, the strength of the magnet being insufficient to move the blade 255 by attraction.

Any suitable type of liquid level responsive control may be used, the present control being represented as comprising the usual casing 261, a float 262, and a float actuated switch 263. The casing 261 has a liquid level chamber which is connected, as at 264, to the interior of the lower shell 176. The switch 263 includes a blade 265 which normally, or during filtering operation is held by float 262 in engagement with a pair of contacts 266, 267. When the level of the liquid in the shells 175, 176 and therefor in the float chamber decreases below the joint of the shells engagement of blade 265 with contacts 266, 267 is broken and upon further decrease in liquid level, the blade 265 bridges a second pair of contacts 268, 269.

The limit switch 244 is diagrammatically represented as comprising a pivoted contact 270 which is normally open and is adapted to engage a contact 271 by upward separation movement of shell 175 from shell 176. The switch 244 is arranged adjacent one edge of shell 175 and has an operating arm 272 engageable by an extension 274 on the shell 175 to close the switch. A second shell operated limit switch 273 is provided to control pump 186 and is represented as comprising a pivoted contact 275 and cooperable fixed contact 276. An extension 277 on the separable shell 175 normally holds contacts 275, 276 in engagement or until the shell 175 moves upward, permitting contact 275 to bias to open position.

The limit switch 246 controlling the conveyor driving motor 221 comprises a pair of contacts 278, 279 and a switch blade 280. As shown, blade 280 normally bridges contacts 278, 279 until broken by the conveyor lugs 245. A second pair of contacts 281, 281 are normally bridged by a movable switch blade 283 which may move in unison with blade 280. Switch 283 controls energization of the electro-magnet 260 the circuit of which is broken when blade 283 is moved away from its contacts by the conveyor.

Figure 18:
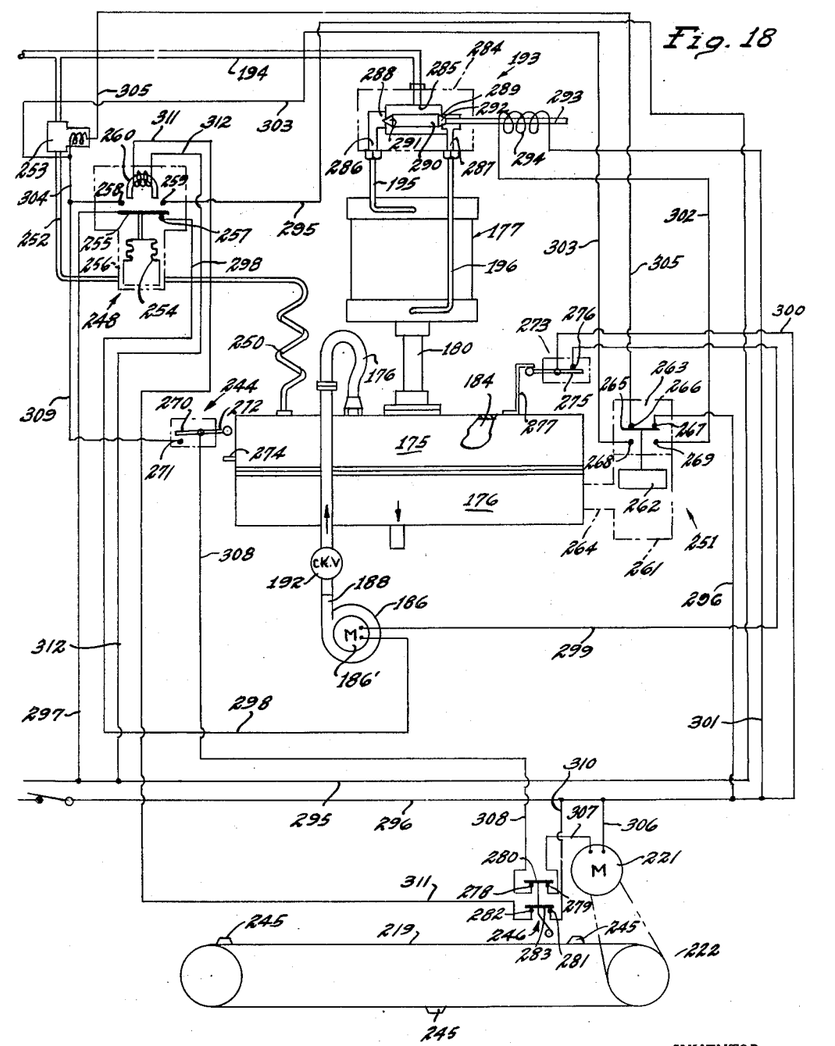
Fig. 18 is a diagrammatic view of the apparatus of Figs. 6 to 17 together with controls and electrical circuits therefor.

As diagrammatically represented in Fig. 18, the air cylinder controlling solenoid valve 193 comprises a body 284 having an inlet 285 in communication with the compressed air conduit 194, and a pair of outlets 286 and 287 in communication respectively with the cylinder conduits 195, 196. Within the solenoid body 284 is a pair of opposed valve ports 288, 289 for connecting inlet 285 to either one or the other of the outlets 286, 187. A movable valve member 290 has conical valve faces 291 and 292 on opposite ends thereof to control ports 288 and 289, and valve member 290 has a core 293 surrounded by a coil 294. In the arrangement shown, coil 294 is normally de-energized, and valve member 290 is biased in a direction closing port 289 and opening port 288 such that the air cylinder is acting downwardly to hold shell 175 against its cooperating shell 176.

The numerals 295 and 296 designate the main lines from a source of electrical energy. The circuitry of the pump motor 186' includes a lead 297 from main lead 295 to the movable contact 255 of the pressure responsive switch which has the fixed contact 257 thereof connected by a lead 298 to one terminal of the pump motor. From the other terminal of the pump motor, a lead 299 connects to the limit switch fixed contact 276 and the movable contact 275 of the limit switch is connected by a lead 300 to the main line 296.

The circuitry of the air cylinder solenoid includes a lead 301 which connects one end of the solenoid coil 294 to the main line 296 and a lead 302 which connects the other end of coil 294 to contact 269 of the liquid level responsive switch 263. From the other contact 268 of switch 263, a lead 303 connects through a lead 304 to the pressure responsive switch contact 258 and to one end of the coil of solenoid 253. The other switch contact 259 is connected to main lead 295. The other end of the coil of solenoid 253 is connected by a lead 305 to contact 266 of the liquid level responsive switch 263 which has cooperating contact 267 connected to the main line 295.

The circuitry of the conveyor motor 221 includes a lead 306 which connects one terminal of the motor to the main line 296. From the other terminal of motor 221, a lead 307 connects to contact 279 of the conveyor limit switch 246 and from cooperating contact 278, a lead 308 connects to the pivoted contact 270 of the shell actuated limit switch 244. A lead 309 connects limit switch contact 271 to lead 304 thus completing the series connection of the motor 221, conveyor operated limit switch 246, shell operated limit switch 244 and pressure switch 248 across the main lines.

The circuitry of the electro-magnet 260 includes a lead 310 which connects contact 281 of the conveyor operated limit switch 246 to the main line 296. From the other limit switch contact 282, a lead 311 connects to one end of the magnet coil which has its other end connected by a lead 312 to the other main line 295.

General operation

With reference particularly to the diagrammatic illustration of Fig. 18 and assuming that the apparatus is in operation, pump 186 will be delivering liquid to be filtered to chamber 184 under pressure to force the liquid at a corresponding rate through the filter medium. Foreign matter filtered from the liquid accumulates on top of the filter paper resulting in increase in pressure in chamber 184 and when this pressure reaches a predetermined pressure, a cycle of automatic operations is initiated to effect replacement of the filter medium. First, the pump 186 is stopped and immediately compressed air is introduced into shell 175 to effect forced drainage of liquid therefrom so as to decrease drainage time. When the level of the liquid decreases below the joint of the shells, the air cylinder 177 raises the upper shell 175 and the conveyor operates to dispose of the accumulated foreign matter and replace the used filter medium. After the filter medium has been replaced, the shell 175 is returned to closed position and operation of the pump 186 is resumed.

Detail operation

As previously mentioned, in Fig. 18, the various devices of my apparatus and the controls therefor are shown in the positions they will assume during filtering operation or when pump 186 is operating. The circuit of the pump is as follows: From main line 295 through lead 297, normally closed pressure switch contacts 255, 257, lead 298, pump motor 186', lead 299, limit switch contacts 276, 275 and through lead 300 to the other main line 296. When the pressure in shell chamber 184 reaches a predetermined pressure due to accumulation of foreign matter on the filter medium, pressure switch 255 breaks with contact 257, stops the pump 186 and makes with contacts 258, 259. When contacts 258, 259 are bridged, the following circuit is immediately completed to energize the forced drainage control solenoid 253. From main line 295 through lead 297, pressure switch contacts 255, 258, lead 304, solenoid coil, lead 305, and through closed liquid level responsive control contacts 266, 267 to the other main line 296. The energized solenoid 253 opens conduit 252 to introduce compressed air into chamber 184 and force the liquid to drain rapidly from the shells 175, 176. When the pump shuts off, the pressure in the shell chamber 184 decreases and as a result the switch 255 tends to make with contact 257 and start the pump, but this is prevented by magnet 260 which is normally energized. The circuit of magnet 260 is as follows: From main line 295 through lead 312 and magnet coil, lead 311, conveyor actuated limit switch contacts 282, 281 and through lead 310 to the other main line 296. When the level of the liquid decreases to a predetermined level in lower shell 176, the float breaks contacts 266, 267 de-energizing solenoid 253, and makes with contacts 268, 269 to complete the circuit of the air cylinder solenoid 294. This circuit is as follows: From main line 295 through closed pressure switch contacts 259, 258, leads 304, 303, closed contacts 268, 269, lead 302, solenoid coil 294 and through lead 301 to the other main line 296. Energization of solenoid coil 294 moves the solenoid valve member 290 to the left closing port 288 and opening port 289 to cause the cylinder 177 to raise shell 175. As the shell 175 moves upwardly, limit switch blade 275 is allowed to bias to open position, and approaching its fully open position, shell 175 moves limit switch blade 270 and holds it in closed position with contact 271. The closing of limit switch contacts 270, 271 completes the following circuit to the conveyor motor 221: From main line 296 through lead 306, motor 221, lead 307, limit switch contacts 279, 278, lead 308, limit switch contacts 270, 271, leads 309, 304, and pressure switch contacts 258, 259 to the other main line 295. The motor 221 now drives the conveyor belt 219 to feed the filter paper to dispose of the used filter paper and foreign matter thereon and replace the used filter paper. When the conveyor has operated sufficiently to position a clean portion of the filter paper between shells 175, 176, one of the conveyor lugs 245 trips the limit switch 246 breaking the circuit of conveyor motor 221 and also the circuit of the electro-magnet 260. When the circuit of the electro-magnet is broken, the pressure switch contacts 258, 259 are broken which breaks the circuit of the cylinder solenoid coil 294. The solenoid valve member 290 now moves to the position shown and the cylinder 177 operates to move the shell 175 down and hold it in closed position displacing the shell seals or gaskets to effect a fluid tight joint. When shell 175 starts down, it releases limit switch 244 which then moves to open circuit position, to keep the conveyor motor circuit open during normal operation. In order to insure that the conveyor motor is stopped, the conveyor lugs 245 may be in the forms of cams designed to hold limit switch 246 open until the shell operated limit switch 244 opens the motor circuit. As the shell 175 approaches its fully closed position, it closes limit switch 273 which returns the pump 186 to operation.

Figure 19:
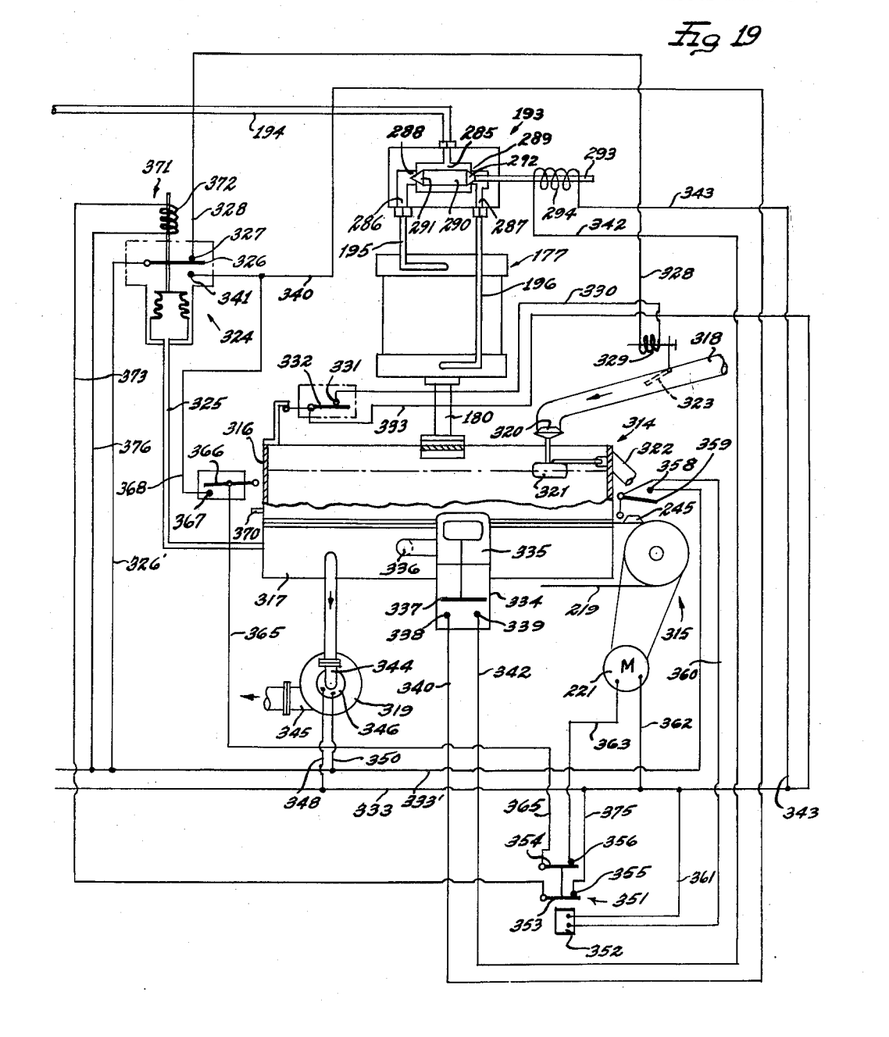
Fig. 19 is a view similar to Fig. 18 of a modification thereof.

In Fig. 19, I have shown diagrammatically a modified form of force feed filtering apparatus similar to my apparatus of Figs. 6 to 18, but differing therefrom principally in that the filter chamber is not pressurized and the need for forced drainage is eliminated. Like units and parts of the two apparatuses have been given like numerals to avoid unnecessary repetitious description. The modified apparatus comprises, in general, a liquid filtering machine 314 and a filter medium feed or replacement machine 315. These machines may be supported on a frame-like standard, such as the standard 160 shown in the apparatus of Figs. 6 to 18.

The liquid filtering machine includes a pair of separable fluid conductors or shells 316 and 317, a liquid gravity feed supply conduit 318, and a suction pump 319. The supply conduit 318 is arranged to conduct liquid to be filtered from a storage tank (not shown) into the top of shell 316 and the suction pump 319 forces the liquid down through the filter paper and delivers the liquid to the point or points of use.

The shells 316, 317 may be essentially the same as the shells of the apparatus of Figs. 6 to 18. If desired, the upper shell 316 may be open at the top thereof as shown, but it is not essential that said shell have an open top. In the present apparatus, the liquid supply conduit 318 is shown as a rigid conduit having a downwardly directed discharge into the upper shell 316, the discharge end of the conduit being spaced from the shell and the shell being open at the top thereof to clear the conduit in raised position of the shell. If desired, the shell 316 could be closed at the top and could be in communication with a rigid supply conduit by an interconnecting flexible hose.

A liquid level control including a valve 320 and a float 321 is provided to maintain the liquid level in shell 316 at a level below the open top of the shell. The valve 320 controls the discharge of supply pipe 318 and is connected to the float 321. As a safety measure, an overflow drain pipe 322 is preferably provided. A shut-off valve 323 is provided in the liquid supply conduit 318 to stop flow preparatory to opening the shells and replacing the filter medium.

A pressure responsive switch 324 communicates by means of a conduit 325 with the lower shell 317 to control valve 323 and separation of the shells 316, 317. The switch 324 includes a switch blade 326 connected to main line 333' by a lead 326' and normally engaging a contact 327 which is connected by a lead 328 to one end of a solenoid coil 329 that actuates the valve 323. The other end of the solenoid coil 329 is connected by a lead 330 to a fixed contact 331 of a normally open limit switch that has a pivoted contact 332 which is connected to main line 333. As shown, the pivoted contact 332 is arranged to be actuated by the opening and closing movement of the shell 316.

A liquid level responsive control 334 has a float chamber 335 connected by a conduit 336 with the interior of shell 317, and a float in chamber 335 carries a bridge contact 337 for cooperation with a pair of fixed contacts 338 and 339. Contact 338 is connected by a lead 340 to a normally open contact 341 of pressure switch 324. Contact 339 is connected by a lead 342 to one end of the cylinder solenoid coil 294 which has its other end connected by a lead 343 to main line 333.

The suction pump 319 has an intake 344 connected to the lower shell 317 and a discharge 345. An electric motor 346 operates continuously to drive pump 319 and is connected across main lines 333 and 333' by leads 348 and 350.

A relay 351 includes the usual coil 352 and a pair of connected switch blades 353 and 354 which are normally closed with fixed contacts 355 and 356 respectively. This is a limit switch relay which is actuated by a switch 359 cooperable with a fixed contact 358 to control relay coil 352. Switch 358 is pivoted and arranged to be closed by the lugs or cams 245 carried by the conveyor chain. Limit switch 359 is connected by a lead 360 to one end of relay coil 352 which has its other end connected by a lead 361 to main line 333, and limit switch contact 358 is connected to the other main line 333'.

The conveyor driving motor 221 is connected by a lead 362 to main lead 333 and by a lead 363 to relay contact 356 which is normally in contact with movable contact 354. Contact 354 is connected by a lead 365 to a movable contact 366 of a limit switch having a fixed contact 367 connected by a lead 368 to main lead 340. The limit switch 366 is arranged for actuation by the opening and closing movement of shell 316 which has an abutment 370 to engage the switch.

Connected to the pressure responsive switch 326 is a solenoid 371 which serves to hold the switch in engagement with contact 341 when the pressure on the bellows increases upon separation of the shells. The solenoid 371 includes a coil 372 which has one end connected by a lead 373 to relay contact 353, the fixed relay contact 355 being connected by a lead 375 to the main line 333. The other end of solenoid coil 372 is connected by a lead 376 to main line 333'.

In operation, the suction pump 319 runs continuously and solenoid coil 329 is normally energized holding valve 323 open to supply liquid to upper shell 316 under control of the float actuated valve 320. During the filtering operation, foreign matter accumulates on the filter paper with corresponding decrease in the filtering rate and eventually the pump 319 substantially evacuates the lower shell 317. As a result, the bellows of pressure switch 314 is collapsed breaking contacts 326, 327 and making contacts 326 and 341. The breaking of contacts 326, 327 de-energizes solenoid coil 329 allowing valve 323 to close and stop flow of liquid to shell 316. The engagement of contacts 326 and 341 closes the circuit of the solenoid coil 294, and the air cylinder acts to raise shell 316. The circuit is as follows: From main line 333' through lead 326', pressure switch contacts 326, 341, lead 340, bridged contacts 338, 339, lead 342, solenoid coil 294 and through lead 343 to the other main line 333. When the shell 316 moves upwardly, limit switch 332 is free to open and break the circuit of solenoid coil 329 whereby to hold valve 323 closed during indexing of the conveyor. Before this occurs, shell abutment 370 engages and closes limit switch 366 which closes circuit to start conveyor motor 221. The conveyor motor circuit is as follows: From main lead 333 through lead 362, motor 221, lead 363, limit switch contacts 356, 354, lead 365, limit switch contacts 366, 367, lead 368, contacts 341, 326, and through lead 326' to the other main line 333'. The motor 221 now operates the conveyor to advance a clean filter medium between the open shells whereupon one of the lugs 245 engages limit switch 359, breaking the circuit of motor 221 at relay contacts 354, 356. Also, relay contacts 353, 355 are broken de-energizing solenoid coil 372 to allow contact 326 to return to the normal position shown engaging the contact 327. When contact 326 breaks with contact 341 the circuit of the air cylinder coil 294 is broken resulting in the air cylinder moving the shell 316 to closed position. As the shell 316 moves to closed position, limit switch 366 opens and 332 closes and closing of the latter energizes coil 329 to open valve 323 and resume the filtering operation.

From the foregoing description, it will now be understood that I have provided improved apparatuses for filtering fluids including automatic replacement of the filter mediums without appreciable loss of filtering time. By the provision of separable shells forming a filter chamber together with provision for forcing liquid from the chamber through the filter medium, it will be appreciated that a higher filtering rate is obtained over machines that depend solely on gravity filtering apparatus of the same size. This enables me to build filtering apparatus which occupies relatively small area compared to gravity filtering machines of like filtering rate. Furthermore, I have provided for delay in separation of the shells until liquid has drained therefrom to avoid spillage and have provided forced drainage to decrease the filter medium replacement time. In addition, in apparatus using sheet material filter medium such as thin paper on a pervious belt in a forced filtering, I have provided for disengaging the filter medium from the interstices of the belt to avoid clogging of the machine by the filter medium.

I claim:

1. In a liquid filtering apparatus, supporting means, a pair of vertically disposed separable fluid conductors having communicating flow passages, a portion of a filter media disposed between said flow passages forming substantially fluid tight joints with said conductors, the upper conductor having an inlet for liquid to be filtered and the lower conductor having an outlet for filtered liquid, feed means operable to feed said filter media along a path of travel to position a clean filter medium between said conductors when said conductors are separated, a control responsive to a condition of the fluid and a control responsive to liquid level in said lower conductor mutually controlling separation of said conductors and said feed means.

2. In a liquid filtering apparatus, supporting means, a pair of vertically disposed separable conductors having communicating flow passages, a portion of a filter material disposed between said separable conductors, the upper conductor having an inlet for liquid to be filtered and the lower conductor having an outlet for filtered liquid, feed means operable to feed the filter material along a path of travel to position a clean portion thereof between said conductors when said conductors are separated, means to deliver liquid to be filtered to the upper conductor, a control responsive to a condition of the liquid in one of said conductors controlling said liquid delivering means to discontinue delivery of liquid to said upper conductor and also controlling separation of said conductors, and a control controlled by said first control delaying separation of said conductors pending decrease in liquid level to a predetermined level in the lower conductor.

3. In a liquid filtering apparatus, supporting means, a pair of vertically disposed separable conductors having communicating flow passages, a portion of a filter material disposed between said separable conductors, the upper conductor having an inlet for liquid to be filtered and the lower conductor having an outlet for filtered liquid, feed means operable to feed the filter material along a path of travel to position a clean portion thereof between said conductors when said conductors are separated, means to deliver liquid to be filtered to the upper conductor, a control responsive to a condition of the liquid in one of said conductors controlling said liquid delivering means to discontinue delivery of liquid to said upper conductor and also controlling separation of said conductors, and a control responsive to liquid level delaying separation of said conductors until the liquid level in said lower conductor decreases to a predetermined level.

4. An apparatus for filtering a liquid and automatically changing the filter comprising, a support, a pair of separable pressure chamber components supported by said support, said components holding a portion of a filter strip therebetween forming a chamber into which liquid is forced under pressure, said components forming a substantially fluid tight joint with the filter strip portion and separable to release the filter strip portion to allow it to be fed to position a clean portion between said components, power means operable to move and hold said components together and to separate them for replacement of the filter portion, pump means operable to pump the liquid into said chamber and maintain the liquid under pressure to force the liquid through the filter portion, means operable to introduce fluid under pressure into said chamber prior to separation of said components to expel liquid therefrom to a level below said joint, control means responsive to a predetermined change in pressure in said chamber to stop flow of liquid thereinto from said pump and also initiate introduction of said fluid, control means responsive to a predetermined decrease in liquid level in said chamber by said fluid pressure to control said power means and separate said components, feed means operable to feed the filter strip to advance a clean portion thereof into position between said components, control means controlling said feed means, control means controlling said power means to move said components together after feeding of clean filter strip therebetween, and control means operable to start flow of liquid into the pressure chamber following movement of said components together.

5. In fluid filtering apparatus, supporting means, a pair of separable fluid conductors to receive therebetween a portion of a filter material movable when said conductors are separated to replace the filter material portion, one of said conductors forming an inlet chamber with the filter material portion for fluid to be filtered and the other of said conductors having an outlet for filtered fluid, a suction pump in communication with the other of said conductors forcing fluid through said filter material portion, and a control responsive to pressure within said other conductor controlling supply of fluid to said inlet chamber.

6. In filtering apparatus, supporting means, a pair of vertically positioned separable liquid conductors between which a portion of a filter material is held and movable when the conductors are separated to replace the filter material portion, the upper of said conductors having an inlet for liquid to be filtered and the lower of said conductors having an outlet for filtered liquid, means to supply liquid to said inlet, a control responsive to a condition of the liquid in one of said conductors controlling said supply means to discontinue flow to said inlet, and means controlled by said control operable to force drain liquid from said upper conductor.

7. In filtering apparatus, supporting means, a pair of vertically positioned separable liquid conductors between which a portion of a filter material is held and movable when the conductors are separated to replace the filter material portion, the upper of said conductors having an inlet for liquid to be filtered and the lower of said conductors having an outlet for filtered liquid, means to supply liquid to said inlet, a control responsive to a condition of the liquid in one of said conductors controlling said supply means to discontinue flow to said inlet, and air pressure introduced into said upper conductor to force drainage therefrom and controlled by said control.

8. In a liquid filtering apparatus, a support, a pair of separable chamber forming components supported by said support holding a filter media therebetween during filtering operation and separable for replacement of the filter media, one of said components forming with said filter media an inlet chamber for liquid to be filtered and the other of said components forming with said filter media an outlet chamber for the filtered liquid, means to supply liquid to be filtered to said inlet chamber, a control responsive to increase in pressure in said inlet chamber to a predetermined pressure to control said supply means, power means operable to separate said components, and a control responsive to liquid level in said outlet chamber acting in conjunction with said pressure responsive control to control said power means.

9. In a liquid filtering apparatus, a support, a pair of separable chamber forming components supported by said support holding a filter media therebetween during filtering operation and separable to replace the filter media, one of said components forming with said filter media an inlet chamber for liquid to be filtered and the other of said components forming with said filter media an outlet chamber for the filtered liquid, means to conduct liquid to the inlet chamber, a control responsive to a condition of the liquid in said inlet chamber to control conduction of liquid thereto, a power element operable to separate said components, and a control responsive to a condition in said outlet chamber cooperating with said first control to control said power element.

10. In a liquid filtering apparatus, a support, a pair of separable chamber forming components supported by said support holding a filter media therebetween during filtering operation and separable to replace the filter media, one of said components forming with said filter media an inlet chamber for liquid to be filtered and the other of said components forming with said filter media an outlet chamber for the filtered liquid, means to conduct liquid to be filtered to the inlet chamber, a control responsive to a condition of the liquid in the inlet chamber operable to stop flow of liquid thereto, means controlled by said control operable to force liquid out of said inlet chamber into said outlet chamber, a power element operable to separate said components, and a control responsive to predetermined liquid level decrease in said outlet chamber cooperable with said first control to control said power element.

11. In a liquid filter apparatus, a support, a pair of upper and lower conductors for passage of the liquid and supported by said support, said conductors having opposed surfaces normally forming a substantially fluid tight joint with opposite sides of a filter medium and separable to release the medium preparatory to feeding of a clean filter medium between said surfaces, the upper of said conductors having an inlet for the liquid to be filtered and the lower of said conductors having an outlet for filtered liquid, power means operable to separate said surfaces and also operable to move and hold said surfaces together in fluid tight relationship, control means responsive to a predetermined differential on opposite sides of the filter medium stopping flow of liquid into said upper conductor and operable to control said power means to effect separation of said surfaces, a delayed action control delaying action of the power means in separation of said surfaces to allow for decrease in liquid level in said lower conductor below said joint prior to separation of said surfaces, feed means operable to replace the filter medium, a control responsive to separation of said surfaces to start said feed means, control means controlling said power means to move said surfaces together and responsive to predetermined feeding of the replacement filter medium, and control means operable to start flow of liquid into said upper conductor and responsive to movement of said surfaces together.

12. In a liquid filter apparatus, a support, a pair of upper and lower conductors for passage therethrough of the liquid and supported by said support, said conductors having opposed gasket surfaces normally engaged to form a substantially fluid tight separating joint with opposite sides of a filter medium and separable to release the medium preparatory to feeding of a clean medium between said surfaces, the upper conductor having an inlet for the liquid to be filtered and the lower conductor having an outlet for filtered liquid, power means operable to move and hold said conductor surfaces together and to separate them for replacement of the filter medium, pump means operable to pump the liquid into the upper conductor and maintain the liquid under pressure to force filter the liquid through the filter medium, control means responsive to a predetermined pressure differential on opposite sides of the filter medium to stop flow of liquid into the upper chamber by the pump means, control means responsive to a predetermined decrease in liquid level in the lower conductor below said joint following cessation of liquid flow into the upper conductor, said liquid level responsive control and said pressure responsive control mutually controlling separation of said surfaces by said power means, feed means operable to feed a new filter medium between said surfaces, control means responsive to separation movement of said surfaces starting said feed means, control means controlling said power means to move said surfaces together and responsive to predetermined feeding of the filter medium, and control means operable to start flow of liquid into the upper conductor and operated by the movement of said conductors together.

13. In a liquid filter apparatus, a support, a pair of upper and lower conductors for passage of the liquid therethrough and supported by said support, said conductors having opposed surfaces normally forming a substantially fluid tight joint with opposite sides of a filter medium interposed therebetween and separable to release the medium preparatory to feeding a clean medium between said surfaces, the upper of said conductors having an inlet for the liquid and the lower of said conductors having an outlet for the filtered liquid, means to deliver liquid to the upper conductor, a control responsive to a condition of the liquid in the lower conductor to stop supply of liquid to the upper conductor and separate said conductor surfaces, a continuously operating suction pump in communication with the lower conductor forcing liquid through the filter medium, and a delayed action control delaying separation of said surfaces by said first control until said pump evacuates liquid from the lower conductor to a liquid level below said joint.

14. In a liquid filter apparatus, a support, a pair of upper and lower conductors for passage of the liquid therethrough and supported by said support, said conductors having opposed surfaces normally forming a substantially fluid tight joint with opposite sides of a filter medium interposed therebetween and separable to release the medium preparatory to feeding a clean medium between said surfaces, the upper of said conductors having an inlet for the liquid and the lower of said conductors having an outlet for the filtered liquid, means to deliver liquid to the upper conductor, a control responsive to a condition of the liquid in the lower conductor to stop supply of liquid to the upper conductor and separate said conductor surfaces, a continuously operating suction pump in communication with the lower conductor forcing liquid through the filter medium, and a control responsive to decrease in liquid level in the lower conductor by the pump to a level below said joint, said liquid level responsive control and said first control mutually controlling separation of said surfaces.

References Cited in the file of this patent

UNITED STATES PATENTS

| | | |
|---|---|---|
| 1,766,684 | Pierce | June 24, 1930 |
| 2,250,672 | Keefer | July 29, 1941 |
| 2,296,486 | Zahn | Sept. 22, 1942 |
| 2,303,262 | Dunmire | Nov. 24, 1942 |
| 2,675,129 | Doubleday | Apr. 13, 1954 |